(12) United States Patent
Ohno et al.

(10) Patent No.: US 7,575,360 B2
(45) Date of Patent: Aug. 18, 2009

(54) SPREAD ILLUMINATING APPARATUS

(75) Inventors: Yasuo Ohno, Kitasaku-gun (JP);
Katsumi Nagata, Kitasaku-gun (JP);
Masahisa Nishio, Kitasaku-gun (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 11/819,454

(22) Filed: Jun. 27, 2007

(65) Prior Publication Data

US 2008/0007956 A1 Jan. 10, 2008

(30) Foreign Application Priority Data

Jul. 10, 2006 (JP) .............................. 2006-189666

(51) Int. Cl.
*F21V 7/04* (2006.01)

(52) U.S. Cl. ........................... 362/633; 362/26; 362/27; 362/634; 362/362; 362/600; 362/612; 362/616

(58) Field of Classification Search ................ 362/362, 362/633, 600, 612, 632, 616, 26, 27, 634
See application file for complete search history.

(56) References Cited

U.S. PATENT DOCUMENTS

| | | | |
|---|---|---|---|
| 6,046,785 A | 4/2000 | Won | |
| 6,538,710 B1 | 3/2003 | Jang | |
| 6,992,736 B2 * | 1/2006 | Saito et al. ..................... 349/58 |
| 2003/0164903 A1 | 9/2003 | Saito et al. | |
| 2005/0047173 A1* | 3/2005 | Kohno .......................... 362/561 |
| 2006/0114689 A1* | 6/2006 | Chang et al. ................ 362/561 |

FOREIGN PATENT DOCUMENTS

| | | |
|---|---|---|
| JP | A-2002-156632 | 5/2002 |
| JP | A 2003-107467 | 4/2003 |
| JP | A 2003-215546 | 7/2003 |
| JP | A 2004-186004 | 7/2004 |
| JP | A 2006-13087 | 1/2006 |

\* cited by examiner

*Primary Examiner*—Sandra L O'Shea
*Assistant Examiner*—Jessica L McMillan
(74) *Attorney, Agent, or Firm*—Oliff & Berridge, PLC

(57) ABSTRACT

A spread illuminating apparatus includes a point light source, a light conductor plate having a light inlet surface facing the point light source, and a housing frame to hold the point light source and the light conductor plate, wherein the housing frame includes an inner frame member and an outer frame member to enclose the inner frame member, the point light source is disposed at an end wall of the outer frame member, the light conductor plate is held in the inner frame member by joint mechanisms such that the light inlet surface of the light conductor plate is positioned inward of a forefront face of the inner frame member with a predetermined distance therefrom, and wherein the inner frame member is housed in the outer frame member with a predetermined constant clearance provided between the point light source and the light inlet surface of the light conductor plate.

8 Claims, 2 Drawing Sheets

SPREAD ILLUMINATING APPARATUS

BACKGROUND OF THE INVENTION

1. Field of the Invention

The present invention relates to a side light type spread illuminating apparatus, especially to a spread illuminating apparatus for use as a lighting means for a liquid crystal display device.

2. Description of the Related Art

A side light type spread illuminating apparatus, in which a primary light source is disposed at a side surface of a light conductor plate, is predominantly used as a lighting means for a liquid crystal display (LCD) device used in a mobile telephone, and like devices. Conventionally, the primary light source has been constituted by a cold cathode lamp. Currently, a point light source, such as a white light emitting diode (LED), is heavily used, which is easier to handle, enables easier downsizing and is more resistant to impact shock than the cold cathode lamp.

Such a spread illuminating apparatus using a point light source is expanding its application field, and the application is now directed not only to a small LCD device for use in a mobile telephone but also to a relatively large LCD device for use in, for example, a car navigation system. In order to sufficiently illuminate a large display area, various approaches have been attempted to efficiently utilize light emitted from the primary light source and also to increase the amount of light emitted.

One of such approaches is disclosed (refer to, for example, Japanese Patent Application Laid-Open No. 2003-215546: Paragraph [0027] and FIG. 2 therein), in which an LED is disposed tightly close to a light conductor plate so that light emitted from the LED can be efficiently introduced into the light conductor plate. FIG. 3 shows a conventional spread illuminating apparatus incorporating the aforementioned approach, in which a light inlet surface LP of a light conductor plate GLB makes contact with the light emitting portions of LEDs 1 and 2, and inward curvatures PJ1 and PJ2 are formed at one side LW2 of a frame-like molded case MLD so as to protrude toward the LEDs 1 and 2 thereby resiliently generating forces (F) to press the light conductor plate GLB against the LEDs 1 and 2, which ensures a close contact between the LEDs 1 and 2 and the light inlet surface LP of the light conductor plate GLB thus allowing lights emitted from the LEDs 1 and 2 to be effectively introduced into the light conductor plate GLB.

Another approach is to increase the amount of light emitted from a primary light source by increasing the number of LEDs disposed at a side of a light conductor plate, or by increasing the current applied to an LED so as to increase the light amount per LED. This approach, however, causes an increase in heat generation at the primary light source thus raising the ambient temperature.

Generally, the luminous efficiency of an LED is lowered in proportion to an increase in temperature, and also in the case of the spread illuminating apparatus of FIG. 3 in which the LED and the light inlet surface of the light conductor plate are in contact with each other, heat generated at the LED is transmitted directly to the light inlet surface of the light conductor plate thus increasingly allowing the light inlet surface to suffer damages, such as heat deformation. To deal with the heat generation problem with the LED, the LED and the light conductor plate are housed in a metallic chassis such that the LED makes contact with the chassis for enhancing the radiation performance (refer to, for example, Japanese Patent Application Laid-Open No. 2004-186004: Paragraphs [0035] to [0037] and FIG. 2 therein).

However, in the case of the spread illuminating apparatus of FIG. 3 in which the LED is in contact with the light inlet surface of the light conductor plate, it is difficult to completely eliminate the heat deformation problem only by arranging the LED to make contact with the metallic chassis for enhancing the radiation performance as described above. As for the prevention of the heat deformation, it is preferable that the LED should not make contact with the light conductor plate. On the other hand, when the LED is disposed at the light inlet surface of the light conductor plate with an air gap provided therebetween, variation in gap size causes variation in brightness and visual quality.

SUMMARY OF THE INVENTION

The present invention has been made in light of the above problems, and it is an object of the present invention to provide a spread illuminating apparatus in which a point light source is disposed at a light inlet surface of a light conductor plate such that a predetermined gap or clearance is provided and maintained consistent therebetween thereby stably retaining an optical coupling therebetween.

In order to achieve the object described above, according to an aspect of the present invention, there is provided a spread illuminating apparatus which includes a point light source, a light conductor plate having an end surface as a light inlet surface facing the point light source, and a housing frame to hold the point light source and the light conductor plate. In the spread illuminating apparatus described above, the housing frame includes an inner frame member and an outer frame member to house the inner frame member, the point light source is disposed at an end wall of the outer frame member, and the light conductor plat is jointed to the inner frame member by a pair of joint mechanisms such that the light inlet surface of the light conductor plate is positioned inward of a forefront face of the inner frame member.

According to the present invention, the housing frame is composed of the inner frame member and the outer frame member to house the inner frame member, the point light source is arranged at the end wall of the outer frame member, and the light conductor plate is held in the inner frame member such that the light inlet face of the light conductor plate is positioned inward of the forefront face of the inner frame member, whereby a predetermined clearance can be stably maintained between the point light source and the light inlet surface of the light conductor plate without contact therebetween.

With the structure described above, since the predetermined clearance can be stably maintained between the point light sourced and the light inlet surface of the light conductor plate without contact occurring between the light conductor plate and the end wall of the outer frame member or without using any extra spacer members placed in contact with the light conductor plate and the end wall of the outer frame member, the thermal transfer from the point light source to the light inlet surface of the light conductor plate is minimized.

In the aspect of the present invention, the light conductor plate may have a pair of side surfaces oriented substantially orthogonal to the light inlet surface, the inner frame member has a pair of side bars respectively opposing the pair of side surfaces of the light conductor plate, and each of the pair of joint mechanisms may include a projection formed at each of the pair of side surfaces of the light conductor plate, a recess formed at each of the pair of side bars of the inner frame member and enclosing the projection, and a beam portion formed along the recess as a result of providing a cutout in the side bar.

The joint mechanism includes the projection formed at the side surface of the light conductor, the recess formed at the side bar of the inner frame member and adapted to enclose the projection, and the beam portion formed along the recess as a result of providing the cutout in the side bar of the inner frame member, whereby the light conductor plate can be firmly held in the inner frame member by a resilient action from the beam portion bending toward the cutout. Accordingly, with a minimum number of components, a predetermined constant clearance can be maintained between the point light source and the light inlet surface of the light conductor plate, and an optical coupling therebetween can be stably maintained.

Also, the light conductor plate can be held in the inner frame member with a necessary and appropriate clearance maintained therebetween in consideration of the difference in the expansion and contraction amount due to change in temperature and humidity between respective component materials.

In the aspect of the present invention, the cutout may be disposed with its longitudinal direction oriented substantially parallel to the longitudinal direction of the side bar of the inner frame member. With this cutout disposition, the light conductor plate can be held in the inner frame member by a resilient action from the beam portion generated in the direction parallel to the light inlet surface of the light conductor plate.

In the aspect of the present invention, the cutout may alternatively be disposed with its longitudinal direction oriented slanting relative to the longitudinal direction of the side bar of the inner frame member. With this cutout disposition, the resilient action from the beam portion includes a component directed orthogonal to the light inlet surface as well as the aforementioned component directed parallel to the light inlet surface. The component directed orthogonal to the light inlet surface ensures contact between the projection of the light conductor plate and the recess face at the side bar of the inner frame member. Consequently, the positional fluctuation of the light conductor plate with respect to the inner frame member in the direction orthogonal to the light inlet surface is reduced, and therefore the optical coupling between the light conductor plate and the point light source can be maintained further stably.

In this connection, the cutout is disposed preferably such that a side face of the projection located toward the light inlet surface makes contact with a side face of the recess while a corner of the projection formed by a side face of the projection located opposite to the side face located toward the light inlet surface makes contact with the beam portion, that is the base face of the recess. Further, the side face of the projection located toward the light inlet surface may be positioned aligned with or close to the light inlet surface, in which case the reference plane for the expansion and contraction of the light conductor plate that are caused due to change in temperature or humidity in the direction orthogonal to the light inlet surface is adapted to correspond substantially to a virtual plane defined by connecting a pair of contact faces each formed between the projection and the recess face.

In the spread illuminating apparatus, the outer frame member has first and second end walls disposed to oppose each other, the point light source is disposed at the first end wall, and an elastic member may be disposed between a rear end bar of the inner frame member and the second end wall so that the forefront face of the inner frame member is pressed against the first end wall of the outer frame member by the elastic force of the elastic member.

And, the outer frame member may be made of a metallic material. Generally, a metallic material is superior to a synthetic resin material in dimensional stability under the environmental changes, such as temperature and humidity changes, and therefore makes a suitable material for the outer frame member. Also, a metallic material has a high heat conductance, and the end wall of the outer frame member made of a metallic material, at which the point light source is disposed, functions favorably as a heat radiator.

Accordingly, in the spread illuminating apparatus of the present invention, the point light source and the light inlet surface of the light conductor plate can be arranged to oppose each other with a predetermined constant clearance maintained therebetween without causing an irreversible thermal deformation of the light conductor plate. Thus, the optical coupling between the point light source and the light conductor plate can be stably held, and the brightness can be enhanced and stabilized for the illuminating apparatus.

DETAILED DESCRIPTION OF THE INVENTION

Figure 1:
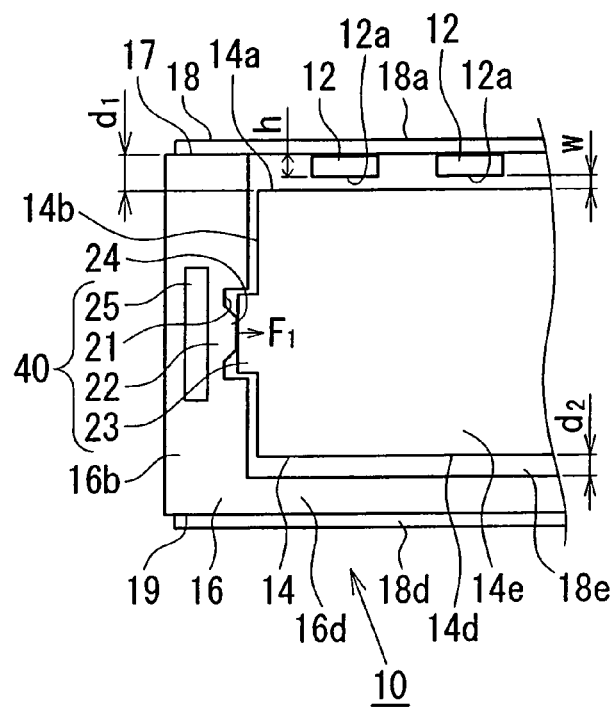
FIG. 1 is a top plan view of a relevant portion of a spread illuminating apparatus according to a first embodiment of the present invention.
Figure 2:
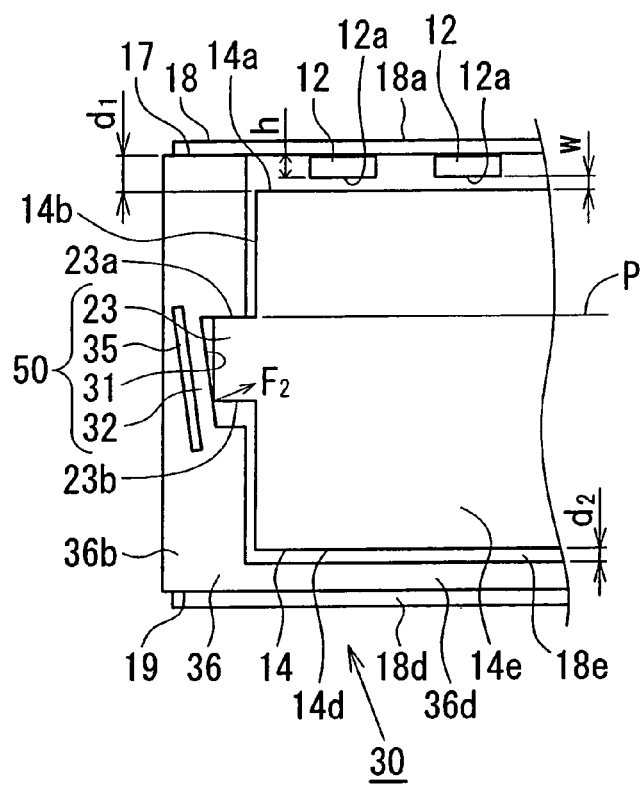
FIG. 2 is a top plan view of a relevant portion of a spread illuminating apparatus according to a second embodiment of the present invention.
Figure 3:
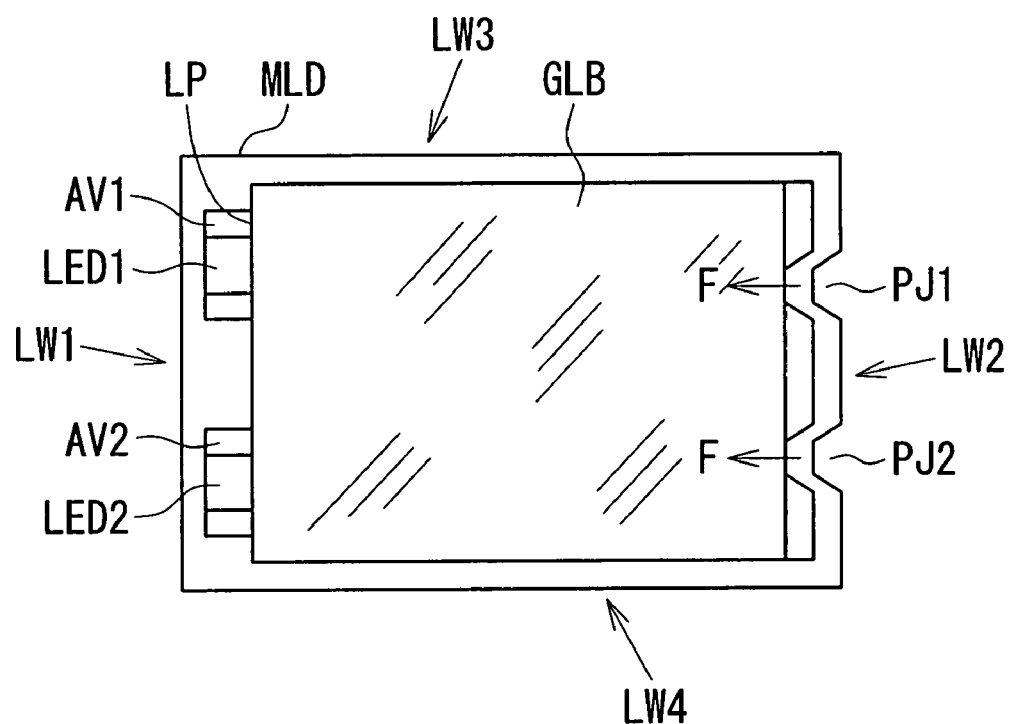
FIG. 3 is a top plan view of a conventional spread illuminating apparatus.

Exemplary embodiments of the present invention will be described with reference to the accompanying drawings. It is noted that the drawings are for the purpose of explanation and do not necessarily reflect the actual configuration and dimension correctly. In FIGS. 1 and 2, the right sides of respective apparatuses, which are structured similarly to the left sides thereof, are omitted. In the description below, a phrase "a pair of" is used for twin parts one of which is omitted in the figures.

Referring to FIG. 1, a spread illuminating apparatus 10 according to a first embodiment of the present invention includes point light sources 12, a light conductor plate 14, and a housing frame which enclose the point light sources 12 and the light conductor plate 14 and which has a double structure composed of an inner frame member 16 and an outer frame member 18 to house the inner frame member 16.

The inner frame member 16 is made by molding white resin, for example, polycarbonate resin containing titanium oxide as a white pigment, and is formed in a substantially square U-shape composed of a pair of side bars 16*b* and an end bar 16*d* which is disposed as to bridge respective one ends of the pair of side bars 16*b* thus constituting one end (lower in the figure) of the inner frame member 16 while no bar is provided at the other end (upper in the figure) of the inner frame member 16 thus defining an open end. An end face 17 of each side bar 16*b* located toward the open end will hereinafter be referred to as a "forefront face" of the inner frame member 16.

The outer frame member 18 is made of a highly heat conductive metal material, for example, aluminum, and includes a quadrangular plane 18*e* and first and second end walls 18*a* and 18*d* disposed in parallel to each other at respective ends of the quadrangular plane 18*e*. For example, the outer frame member 18 may be structured by press working into a substantially square U shape in side cross section such that the front and rear end walls 18a and 18d stand perpendicular to the quadrangular plane 18e.

In the spread illuminating apparatus 10, the point light sources 12 each constituted typically by a white light emitting diode (LED) are arranged at the first end wall 18a of the outer frame member 18. Though the present invention is not limited to any specific arrangement of the point light sources 12, in the embodiment shown in FIG. 1, the point light sources 12 are each mounted on a circuit board (not shown) preferably constituted by a flexible printed circuit board, such that a face of the point light source 12 opposite to its light emitting face 12a is attached to the circuit board, and the circuit board may be fixedly attached to the front end wall 18a by a fixing means (not shown), such as a heat conductive adhesive tape. With this structure, the outer frame member 18, which is made of metallic material, functions effectively also as a radiator of the heat generated at the point light sources 12.

The light conductor plate 14 is a rectangular plate member made of transparent resin, for example, acrylic resin, and polycarbonate resin, and defining a light inlet surface 14a, a pair of side surfaces 14b oriented substantially orthogonal to the light inlet surface 14a, and a rear end surface 14d opposite to the light inlet surface 14a. The light conductor plate 14 is housed in the inner frame member 16 such that the light inlet surface 14a is disposed toward the open end of the inner frame member 16, and that the pair of side surfaces 14b are jointed respectively to the pair of side bars 16b of the inner frame member 16 via a pair of joint mechanisms 40 to be described below.

Each joint mechanism 40 is composed of a projection 23 formed at the side surface 14b of the light conductor plat 14, a recess 21 formed at the inner surface of the side bar 16b of the inner frame member 16 with its base face oriented substantially parallel to the length of the side bar 16b, and a beam portion 22 formed along the recess 21 as a result of providing a cutout 25 in the side bar 16b and having its longitudinal direction oriented substantially parallel to the length of the side bar 16b. With the mechanism structured above, when the light conductor plate 14 is placed inside the inner frame member 16 with the projection 23 set in the recess 21, the beam portion 22 is caused to bend toward the cutout 25 thereby generating a resilience, that is a pressing force ($F_1$), in the direction parallel to the light inlet surface 14a of the light conductor plate 14, whereby the light conductor plate 14 is jointed to the inner frame member 16.

In this connection, the beam portion 22 shown in FIG. 1 is shaped such that a contact area 24 thereof (that is the base face of the recess 21) protrudes taperingly toward the projection 23 in order to make the pressing force ($F_1$) act effectively, but the present invention is not limited to such a contact area configuration.

In the spread illuminating apparatus 10, the inner frame member 16 and the light conductor plate 14 are laid out such that when the light conductor plate 14 is jointed to the inner frame member 16, the light inlet surface 14a of the light conductor plat 14 is positioned inward of the forefront face 17 of the inner frame member 16 by a predetermined distance ($d_1$), and the inner frame member 16 having the light conductor plate 14 disposed therein as described above is placed in the outer frame member 18 such that the light inlet surface 14a of the light conductor plate 14 oppose the point light sources 12 disposed at the first end wall 18a of the outer frame member 18.

The predetermined distance ($d_1$) between the forefront face 17 of the inner frame member 16 and the light inlet surface 14a of the light conductor plate 14 is set such that a predetermined dimension (w) is added to a height (h) of the point light source 12 measuring from the first end wall 18a of the outer frame member 18, whereby a constant clearance corresponding to the predetermined dimension (w) is ensured between the light emitting face 12a of the point light source 12 and the light inlet surface 14a of the light conductor plate 14.

Consequently, without contact occurring between the light conductor plate 14 and the first end wall 18a of the outer frame member 18 or without using any extra spacer members placed in contact with the light conductor plate 14 and the first end wall 18a of the outer frame member 18, the dimension (w) between the point light source 12 and the light inlet surface 14a can be maintained constant according to the manufacturing precision required in providing a clearance between the inner frame member 16 and the outer frame member 18 and also between the faces of the recess 21 and the projection 23, and therefore the optical coupling between the point light source 12 and the light conductor plate 14 can be stably maintained while minimizing the heat transfer from the point light source 12 to the light inlet surface 14a of the light conductor plate 14.

Also, in the spread illuminating apparatus 10, by means of the joint mechanisms 40 structured to joint the side surfaces 14b of the light conductor plate 14 to the side bars 16b of the inner frame member 16, the light conductor plate 14 can be jointed to the inner frame member 16 while securely maintaining, between the three surfaces (specifically, the pair of side surfaces 14b and the rear end surface 14d) of the light conductor plate 14 and the three bars (specifically, the pair side bars 16b and the rear end bar 16d) of the inner frame member 16, a necessary and appropriate clearance ($d_2$) specified in consideration of the expansion and contraction amount difference which exists between the light conductor plate 14 and the inner frame member 16 and which is determined according to the properties (linear expansion coefficient and the like) of their respective materials and on their respective dimensions along the expansion direction.

For example, according to the examination by the present inventors, it is confirmed that when the light conductor 14 and the inner frame member 16 are made of polycarbonate as a base material, and if the length of the light conductor plate 14 is set to 200 mm (this corresponds substantially to the longitudinal dimension of a light conductor plate for use in a spread illuminating apparatus for a 9 inch display screen), an open space of 0.363 mm provided at each side of the light conductive plate 14 is appropriate for the clearance ($d_2$) given for expansion for a temperature difference of 60 degrees C. in view of the expected amount of expansion due to the moisture absorption by the light conductor plate 14.

Description will now be made on a second embodiment of the present invention with reference to FIG. 2, wherein any component parts corresponding to those in FIG. 1 are denoted by the same reference numerals, and a redundant description thereof will be omitted as appropriate with a focus set on differences from the first embodiment.

Referring to FIG. 2, a spread illuminating apparatus 30 according to the second embodiment, like the spread illuminating apparatus 10 of the first embodiment, includes point light sources 12, a light conductor plate 14, and a housing frame which encloses the point light sources 12 and the light conductor plate 14 and which has a double structure. The double structure of the spread illuminating apparatus 30 is composed of an outer frame member 18 which is identical with the outer frame member 18 of the spread illuminating 10 and an inner frame member 36 which differs from the inner frame member 16 of the spread illuminating apparatus 10.

In the spread illuminating apparatus 30 described above, each of a pair of joint mechanisms 50 which joint the light conductor plate 14 to the inner frame member 36 is structured such that while a projection 23 is formed at a side surface 14b of the light conductor plate 14 in the same way as the joint mechanism 40 of the spread illuminating apparatus 10, a recess 31 is formed at a side bar 36b of the inner frame member 36 with its base face slanting relative to the longitudinal direction of the side bar 16b, and a cutout 35 is formed in the side bar 36b with its longitudinal direction slanting relative to the longitudinal direction of the side bar 16b thus making a beam portion 32 also slanting relative to the longitudinal direction of the side bar 36b.

With the structure of the joint mechanism 50 described above, a side face 23a of the projection 23 located toward a light inlet surface 14a of the light conductor plate 14 makes contact with the side bar 36b at a side face of the recess 31, and a corner of the projection 23 formed by a side face 23b opposite to the side face 23a makes contact with the side bar 36b at the slanting beam portion 32, that is, at the base face of the recess 31. This differentiates the spread illuminating apparatus 30 from the spread illuminating apparatus 10.

In the spread illuminating apparatus 30, a resilient action from the beam portion 32 that constitutes a pressing force ($F_2$) includes a component directed parallel to the light inlet surface 14a and also a component directed orthogonal to the light inlet surface 14a. The component directed orthogonal to the light inlet surface 14a causes the side face 23a (hereinafter referred to as "contact face" as appropriate) of the projection 23 located toward the light inlet surface 14a to be pressed toward the light inlet surface 14a, whereby the contact between the contact face 23a and the side face of the recess 31 is firmly held. Consequently, a predetermined distance ($d_1$) between the light inlet surface 14a of the light conductor plate 14 and a forefront face 17 of the inner frame member 16 is inhibited from fluctuating, and therefore the optical coupling between the light conductor plate 14 and the point light source 12 can be maintained further stably.

Further, in the spread illuminating apparatus 30, since the light conductor plate 14 is held in the inner frame member 16 with the contact face 23a of the projection 23 making contact with the side face of the recess 31, the reference plane for the expansion and contraction of the light conductor plate 14 that are caused due to change in temperature or humidity in the direction orthogonal to the light inlet surface 14a is adapted to correspond substantially to a virtual plane (P) defined by connecting a pair of contact faces 23a if the pair of contact faces 23a are symmetrically positioned.

With the structure described above, if the contact face 23a is set aligned with or close to the light inlet surface 14a of the light conductor plate 14 with respect to its vertical (in the figure) position, then the light inlet surface 14a is arranged aligned with or close to the virtual plane (P), whereby the positional fluctuation of the light inlet surface 14a resulting from the expansion and contraction of the light conductor plate 14, eventually the fluctuation of the distance (w) between the light inlet surface 14a and the point light source 12, can be minimized or eliminated.

In this connection, it is known that generally, various problems are raised with the light conductor plate 14 having the projection 23. For example, if a segment shaped like the projection 23 is added to the side surface 14b of the light conductor plate 14, it can happen that a bright point is generated at the segment (projection 23), a light loss is suffered, or the light conductor plate 14 incurs a formability difficulty when injection-molded. Accordingly, the position of the projection 23 must be appropriately determined in order to suppress the occurrence of the above problems and also in view of the effectiveness in suppressing the fluctuation of the distance (w).

The present invention has been described with reference to the exemplary embodiments, but the spread illuminating apparatus according to the present invention is not limited to the configurations of the embodiments described above. For example, in the spread illuminating apparatus 10/30 of FIG. 1/2, an elastic member constituted by an elastomer resin, a spring, or the like, or alternatively formed integrally with either the inner frame member 16/36 or the outer frame member 18 may be disposes between the end bar 16d/36d of the inner frame member 16/36 and the second end wall 18b of the outer frame member 18, thereby flexibly and stably jointing the inner frame member 16/36 and the outer frame member 18.

What is claimed is:

1. A spread illuminating apparatus comprising:
   a point light source;
   a light conductor plate having an end surface as a light inlet surface facing the point light source; and
   a housing frame to hold the point light source and the light conductor plate, the housing frame comprising an inner frame member and an outer frame member to house the inner frame member, wherein:
   the point light source is disposed at an end wall of the outer frame member;
   the light conductor plate is jointed to the inner frame member by a pair of joint mechanisms such that the light inlet surface of the light conductor plate is positioned inward of a forefront face of the inner frame member so as to provide a clearance between the point light source and the light inlet surface of the light conductor plate; and
   the inner frame member is formed in a substantially square U-shape so as to define an open end.

2. A spread illuminating apparatus according to claim 1, wherein the light conductor plate has a pair of side surfaces oriented substantially orthogonal to the light inlet surface, the inner frame member has a pair of side bars respectively opposing the pair of side surfaces of the light conductor plate, and wherein each of the pair of joint mechanisms comprises a projection formed at each of the pair of side surfaces of the light conductor plate, a recess formed at each of the pair of side bars of the inner frame member and enclosing the projection, and a beam portion formed along the recess as a result of providing a cutout in the side bar of the inner frame member.

3. A spread illuminating apparatus according to claim 2, wherein the cutout is disposed with its longitudinal direction oriented substantially parallel to a longitudinal direction of the side bar of the inner frame member.

4. A spread illuminating apparatus according to claim 3, wherein the outer frame member is made of a metal material.

5. A spread illuminating apparatus according to claim 2, wherein the cutout is disposed with its longitudinal direction oriented slanting relative to a longitudinal direction of the side bar of the inner frame member.

6. A spread illuminating apparatus according to claim 5, wherein the outer frame member is made of a metal material.

7. A spread illuminating apparatus according to claim 2, wherein the outer frame member is made of a metal material.

8. A spread illuminating apparatus according to claim 1, wherein the outer frame member is made of a metal material.

* * * * *